(12) United States Patent
Furukawa et al.

(10) Patent No.: US 12,294,083 B2
(45) Date of Patent: May 6, 2025

(54) NEGATIVE ELECTRODE FOR ALL-SOLID-STATE BATTERY AND ALL-SOLID-STATE BATTERY

(71) Applicant: Maxell, Ltd., Kyoto (JP)

(72) Inventors: Kazuki Furukawa, Kyoto (JP); Yuta Sato, Kyoto (JP); Masaki Nishimura, Kyoto (JP); Haruki Kamizori, Kyoto (JP)

(73) Assignee: Maxell, Ltd., Kyoto (JP)

( * ) Notice: Subject to any disclaimer, the term of this patent is extended or adjusted under 35 U.S.C. 154(b) by 547 days.

(21) Appl. No.: 17/637,297

(22) PCT Filed: Aug. 24, 2020

(86) PCT No.: PCT/JP2020/031758
§ 371 (c)(1),
(2) Date: Feb. 22, 2022

(87) PCT Pub. No.: WO2021/044883
PCT Pub. Date: Mar. 11, 2021

(65) Prior Publication Data
US 2022/0285674 A1    Sep. 8, 2022

(30) Foreign Application Priority Data

Sep. 2, 2019    (JP) .................. 2019-159369

(51) Int. Cl.
*H01M 4/485*    (2010.01)
*H01M 4/02*    (2006.01)
(Continued)

(52) U.S. Cl.
CPC ....... *H01M 4/485* (2013.01); *H01M 10/0525* (2013.01); *H01M 10/0562* (2013.01);
(Continued)

(58) Field of Classification Search
CPC .................. H01M 10/0525; H01M 10/0562
See application file for complete search history.

(56) References Cited

U.S. PATENT DOCUMENTS

| | | |
|---|---|---|
| 2005/0221188 A1 | 10/2005 | Takami et al. |
| 2012/0052399 A1 | 3/2012 | Takami et al. |
| | (Continued) | |

FOREIGN PATENT DOCUMENTS

| | | |
|---|---|---|
| EP | 3225592 A1 | 10/2017 |
| EP | 3594182 A1 | 1/2020 |
| | (Continued) | |

OTHER PUBLICATIONS

Auvergniot et al., "Redox activity of argyrodite Li6PS5Cl electrolyte in all-solid-state Li-ion battery: An APS study", Solid State Ionics, vol. 300, 2017, pp. 78-85. (Year: 2017).*

(Continued)

*Primary Examiner* — Karie O'Neill Apicella
(74) *Attorney, Agent, or Firm* — Birch, Stewart, Kolasch & Birch, LLP

(57) ABSTRACT

An all-solid-state battery having excellent output characteristics, and a negative electrode for an all-solid-state battery that can be used in the all-solid-state battery are provided. A negative electrode for an all-solid-state battery according to the present invention includes a molded body made of a negative-electrode mixture that contains a negative-electrode active material, a solid electrolyte, and a conductive assistant, and lithium titanium oxide particles in which a ratio $D_p/D_{50}$ of a primary particle diameter $D_p$ to a particle diameter $D_{50}$ is greater than 0.6 and a specific surface area is 2 $m^2/g$ or more are contained as the negative-electrode active material. Also, an all-solid-state battery according to the present invention includes a positive electrode, a negative electrode, and a solid electrolyte layer located between the positive electrode and the negative electrode, and the (Continued)

negative electrode for an all-solid-state battery according to the present invention is used as the negative electrode.

6 Claims, 2 Drawing Sheets

(51) Int. Cl.
  *H01M 10/0525* (2010.01)
  *H01M 10/0562* (2010.01)
(52) U.S. Cl.
  CPC .............................. *H01M 2004/021* (2013.01); *H01M 2004/027* (2013.01); *H01M 2300/008* (2013.01)

(56) References Cited

U.S. PATENT DOCUMENTS

| | | | |
|---|---|---|---|
| 2013/0260251 | A1 | 10/2013 | Shiroki et al. |
| 2014/0065469 | A1 | 3/2014 | Takami et al. |
| 2017/0288223 | A1 | 10/2017 | Ogawa et al. |
| 2019/0044179 | A1* | 2/2019 | Sugimori .............. H01M 4/131 |
| 2020/0203728 | A1 | 6/2020 | Ogawa et al. |

FOREIGN PATENT DOCUMENTS

| | | |
|---|---|---|
| JP | 2003-187876 A | 7/2003 |
| JP | 2005-317512 A | 11/2005 |
| JP | 2012-243644 A | 12/2012 |
| JP | 2013-206869 A | 10/2013 |
| JP | 2017-188445 A | 10/2017 |

OTHER PUBLICATIONS

Auvergniot et al., "Redox activity of argyrodite $Li_6PS_5Cl$ electrolyte in all-solid-state Li-ion battery: An XPS study", Solid State Ionics, vol. 300, 2017, pp. 78-85.

Extended European Search Report for European Application No. 20860294.6, dated Sep. 8, 2022.

International Search Report, issued in PCT/JP2020/031758, PCT/ISA/210, dated Oct. 20, 2020.

\* cited by examiner

NEGATIVE ELECTRODE FOR ALL-SOLID-STATE BATTERY AND ALL-SOLID-STATE BATTERY

TECHNICAL FIELD

The present invention relates to an all-solid-state battery having excellent output characteristics, and a negative electrode for an all-solid-state battery that can be used in the all-solid-state battery

BACKGROUND ART

In recent years, the development of portable electronic devices such as cellular phones and laptop personal computers, the practical use of electric vehicles, and the like have led to the need for compact and lightweight secondary batteries that have a high capacity and a high energy density.

Currently, in lithium secondary batteries that can meet this demand, especially lithium-ion secondary batteries, a lithium-containing composite oxide such as lithium cobalt oxide ($LiCoO_2$) or lithium nickel oxide ($LiNiO_2$) is used as a positive-electrode active material, graphite or the like is used as a negative-electrode active material, and an organic electrolyte solution containing an organic solvent and a lithium salt is used as a nonaqueous electrolyte.

With the further development of devices that use lithium-ion secondary batteries, there is an increasing demand for improvement of various characteristics of lithium-ion secondary batteries, such as a longer life, a higher capacity, and a higher energy density.

In one example, a positive-electrode active material is modified to improve the characteristics of lithium-ion secondary batteries. For example, Patent Document 1 proposes using, as a positive-electrode active material, a nickel-containing lithium-transition metal composite oxide with a layered structure in which the ratio of the average particle diameter based on electron microscope observation to the average particle diameter based on the cumulative particle size distribution on a volume basis is less than or equal to a specific value.

A high degree of safety and a high degree of reliability are also required for lithium-ion secondary batteries. However, since an organic electrolyte solution used in a lithium-ion secondary battery contains a flammable organic solvent, the organic electrolyte solution may generate abnormal heat when an abnormal situation such as a short circuit occurs in the battery. In recent years, as the energy density of lithium-ion secondary batteries and the amount of an organic solvent in the organic electrolyte solution have been increased, there is a growing need for safety and reliability in lithium-ion secondary batteries.

Under these circumstances, all-solid-state lithium secondary batteries (all-solid-state batteries) in which no organic solvents are used have been attracting attention. An all-solid-state battery includes, instead of conventional organic solvent-based electrolytes, a molded body made of a solid electrolyte in which no organic solvents are used, and is highly safe because there is no risk that the solid electrolyte generates abnormal heat.

Improvements in active materials for all-solid-state batteries have also been attempted. For example, Patent Document 2 proposes a technology to increase the capacity of an all-solid-state battery during high-current discharge by using a positive-electrode active material and a negative-electrode active material in which a certain relationship between the specific surface area and the electric capacity is satisfied.

Also, in Patent Document 3, an attempt is made to improve the battery characteristics of all-solid-state batteries by using an electrode in which lithium titanate that has a certain specific surface area and is adjusted such that a certain relationship between the average particle diameter thereof and the average particle diameter of solid electrolyte particles is satisfied is used as the active material, and thereby achieving favorable contact between the active material and the solid electrolyte particles.

CITATION LIST

Patent Documents

Patent Document 1: JP 2017-188445A
Patent Document 2: JP 2003-187876A
Patent Document 3: JP 2012-243644A

SUMMARY OF INVENTION

Problem to be Solved by the Invention

Nowadays, the number of fields to which all-solid-state batteries are applied is rapidly increasing. It is conceivable that they may be used in, for example, applications that require electric discharge at large current values, and therefore, it is necessary to enhance the output characteristics to meet these requirements.

The present invention was achieved in light of the aforementioned circumstances, and it is an object thereof to provide an all-solid-state battery having excellent output characteristics, and a negative electrode for an all-solid-state battery that can be used in the all-solid-state battery.

Means for Solving Problem

A negative electrode for an all-solid-state battery according to the present invention includes a molded body made of a negative-electrode mixture that contains a negative-electrode active material, a solid electrolyte, and a conductive assistant, wherein lithium titanium oxide particles in which a ratio $D_p/D_{50}$ of a primary particle diameter $D_p$ to a particle diameter $D_{50}$ is greater than 0.6 and a specific surface area is 2 $m^2/g$ or more are contained as the negative-electrode active material.

Also, an all-solid-state battery according to the present invention includes: a positive electrode; a negative electrode; and a solid electrolyte layer located between the positive electrode and the negative electrode, wherein the negative electrode for an all-solid-state battery according to the present invention is used as the negative electrode.

Effects of the Invention

With the present invention, it is possible to provide an all-solid-state battery having excellent output characteristics, and a negative electrode for an all-solid-state battery that can be used in the all-solid-state battery.

DISCLOSURE OF INVENTION

Negative Electrode for All-Solid-State Battery

Figure 1:
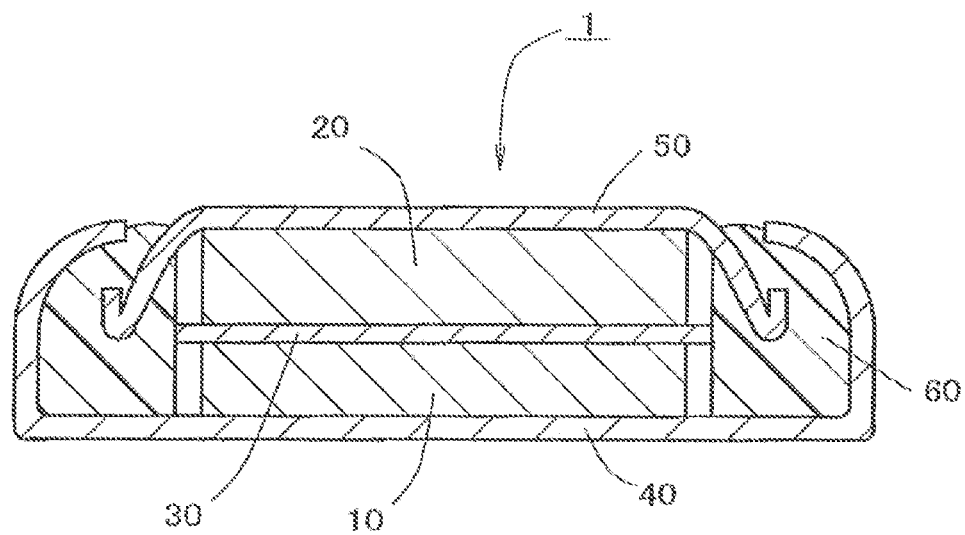
FIG. 1 is a schematic cross-sectional view showing an example of an all-solid-state battery according to the present invention.

A negative electrode for an all-solid-state battery according to the present invention (which may also be referred to merely as a "negative electrode" hereinafter) contains a lithium titanium oxide as a negative-electrode active material.

A lithium titanium oxide is known as a negative-electrode active material for all-solid-state batteries that include a solid electrolyte, and lithium-ion secondary batteries that include an organic electrolyte solution, and secondary particles thereof constituted by aggregated fine primary particles are currently used.

Electrodes (positive electrodes and negative electrodes) of all-solid-state batteries may be manufactured through a process in which an active material, a solid electrolyte, a conductive assistant, and the like are mixed without adding a solvent to form an electrode mixture (a positive electrode mixture or negative electrode mixture), and then the thus-obtained electrode mixture is molded into a molded body through compression molding. When secondary particles of a lithium titanium oxide are used as the active material, the secondary particles often break down into primary particles during molding of the electrode mixture (negative-electrode mixture).

If the secondary particles of a lithium titanium oxide are in favorable contact with the solid electrolyte and the conductive assistant during the preparation of the electrode mixture, the electron conductivity and ion conductivity in the negative electrode (in the molded body made of the negative-electrode mixture) will be favorable by producing the molded body while maintaining this state as much as possible. However, it is presumed that the primary particles that have separated from the secondary particles during the molding are difficult to maintain contact with the solid electrolyte and the conductive assistant. In particular, since a lithium titanium oxide is a material with low conductivity, there is a high possibility that the primary particles that have separated from the secondary particles are not involved in the charge-discharge reaction of the battery. If the ratio of the primary particles that have separated from the secondary particles increases, the output characteristics of the battery, for example, are likely to be impaired. As shown in comparative examples, which will be described later, all-solid-state batteries that include a negative electrode in which secondary particles of a lithium titanium oxide are used as the active material have a large resistance value (DCR) and inferior output characteristics.

Therefore, in the negative electrode according to the present invention, lithium titanium oxide particles in which a ratio $D_p/D_{50}$ of a primary particle diameter $D_p$ to a particle diameter $D_{50}$ is greater than 0.6 and the specific surface area is 2 m²/g or more are used as the active material, so that an all-solid-state battery having excellent output characteristics can be constructed.

The particle diameter $D_{50}$ of the lithium titanium oxide particles refers to a particle diameter at a cumulative frequency of 50% on a volume basis. When the lithium titanium oxide particles are present in the form of secondary particles, the particle diameter $D_{50}$ means a secondary particle diameter. The state in which the ratio $D_p/D_{50}$ of the primary particle diameter $D_p$ of lithium titanium oxide particles to the particle diameter $D_{50}$ is greater than 0.6 means that the degree of aggregation of the primary particles is small, and the ratio of primary particles that are not included in the secondary particles is high. That is, a large part of lithium titanium oxide particles that satisfy the relationship $D_p/D_{50}>0.6$ is constituted by primary particles, and therefore, it is believed that particles as mentioned above that separate from the secondary particles and are thus not in contact with the solid electrolyte and the conductive assistant are less likely to be produced while a negative-electrode mixture containing the lithium titanium oxide particles is molded into a molded body through press molding or the like.

Although ordinary primary particles of a lithium titanium oxide have a relatively high surface smoothness, the lithium titanium oxide particles according to the present invention have a specific surface area of 2 m²/g or more and have rough surfaces, and thus are likely to maintain contact with the solid electrolyte and the conductive assistant.

It is believed that the negative electrode according to the present invention can be used in an all-solid-state battery having excellent output characteristics, due to the above-mentioned functions of lithium titanium oxide particles having a certain value of $D_p/D_{50}$ and a certain specific surface area.

The negative electrode according to the present invention includes a molded body made of a negative-electrode mixture containing lithium titanium oxide particles serving as the negative-electrode active material, a solid electrolyte, a conductive assistant, and the like, and examples thereof include a negative electrode constituted by only the above-mentioned molded body, and a negative electrode having a structure in which the molded body and a current collector are integrated together.

Examples of the lithium titanium oxide include those represented by General Composition Formula (1) below.

$$\mathrm{Li}[\mathrm{Li}_{1/3-a}\mathrm{M}^1{}_a\mathrm{Ti}_{5/3-b}\mathrm{M}^2{}_b]\mathrm{O}_4 \quad (1)$$

In General Composition Formula (1) above, $M^1$ is at least one element selected from the group consisting of Na, Mg, K, Ca, Sr, and Ba, $M^2$ is at least one element selected from the group consisting of Al, V, Cr, Fe, Co, Ni, Zn, Ym, Zr, Nb, Mo, Ta, and W, and a and b respectively satisfy $0 \le a < 1/3$ and $0 \le b \le 2/3$.

That is, in the lithium titanium oxide represented by General Composition Formula (1) above, a portion of the Li site may be substituted by the element $M^1$. Note that, in General Composition Formula (1), a, which represents the ratio of the element $M^1$, is preferably less than 1/3. In the lithium titanium oxide represented by General Composition Formula (1) above, a, which represents the ratio of the element $M^1$, may be 0 because Li does not have to be substituted by the element $M^1$.

Also, in the lithium titanium oxide represented by General Composition Formula (1) above, the element $M^2$ is a component for enhancing the electron conductivity of the lithium titanium oxide, and when b, which represents the ratio of the element $M^2$, satisfies $0 \le b \le 2/3$, it is possible to favorably ensure the effect of enhancing the electron conductivity.

The ratio $D_p/D_{50}$ of the primary particle diameter $D_p$ to the particle diameter $D_{50}$ in the lithium titanium oxide particles is greater than 0.6, and preferably 0.8 or greater, from the viewpoint of enabling a battery having excellent output characteristics to be constructed by increasing the ratio of the primary particles. Note that all the lithium titanium oxide particles may be primary particles, and therefore, the favorable upper limit of $D_p/D_{50}$ is 1.

Note that a larger primary particle diameter (the average particle diameter of primary particles) $D_p$ of the lithium titanium oxide particles is preferable for the purpose of reducing the number of lithium titanium oxide particles that are in contact with each other because the contact resistance between the lithium titanium oxide particles is large. Specifically, $D_p$ is preferably 0.7 μm or more, and more preferably 1.2 μm or more. Also, the upper limit of $D_p$ of the lithium titanium oxide particles is about 10 μm.

It is sufficient that the particle diameter $D_{50}$ of the lithium titanium oxide particles is within such a range that $D_p/D_{50}$ satisfies the above-mentioned value.

The primary particle diameter $D_p$ of the lithium titanium oxide particles as used herein is a value determined as follows: 50 particles whose outlines can be clearly seen are selected in an image of the lithium titanium oxide particles observed at 10000-fold magnification under a scanning electron microscope (SEM), the particle diameters in the longitudinal axes of the selected particles are measured, and the average value of all the particles is calculated.

Also, the particle diameter $D_{50}$ of the lithium titanium oxide particles as used herein is a value determined, using a laser scattering particle size distribution analyzer (e.g., "LA-920" manufactured by HORIBA, Ltd.), as a particle diameter at a cumulative frequency of 50% on a volume basis in a state in which the particles are dispersed in a medium in which the particles are insoluble. Note that $D_{50}$ and the average particle diameters of various types of particles described herein other than the lithium titanium oxide particles are also determined using these methods.

The specific surface area of the lithium titanium oxide particles is 2 m²/g or more from the viewpoint of enabling contact with the solid electrolyte and the conductive assistant to be favorably maintained and thereby enabling a battery having excellent output characteristics to be constructed. Also, the upper limit of the specific surface area of the lithium titanium oxide is not particularly limited, but is generally about 20 m²/g.

The specific surface area of the lithium titanium oxide particles as used herein is determined by measuring and calculating a surface area using the BET formula, which is a theoretical formula for multimolecular-layer adsorption, and is the specific surface area of the surfaces and micropores of the active material. Specifically, the specific surface area is a value determined as a BET specific surface area using a specific surface area measurement apparatus (e.g., "Macsorb HM model-1201" manufactured by Mountech Co., Ltd.) that employs a nitrogen adsorption method.

Note that $D_{50}$ and the BET specific surface area of the lithium titanium oxide extracted from the molded body made of the negative-electrode mixture can also be determined.

An example of the method for extracting a lithium titanium oxide from the molded body made of the negative-electrode mixture is the following method.

After a 0.1-g sample is collected from the molded body made of the negative-electrode mixture and is washed twice using 200 cc of water, the sample is left to stand in 200 cc of water for 12 hours, and then the supernatant is removed while a sediment in the water is left. After a series of operations from the washing by water to the removal of the supernatant is repeated 10 times, the obtained sediment is dried at 120° C. for 2 hours and further dried at 60° C. for 12 hours, and thus the lithium titanium oxide in the molded body made of the negative-electrode mixture is obtained.

The lithium titanium oxide particles in which $D_p/D_{50}$ and the specific surface area satisfy the above-mentioned values can be obtained by pulverizing the secondary particles of the lithium titanium oxide into primary particles. The lithium titanium oxide can be pulverized using, for example, a planetary ball mill.

For example, the specific surface area of the obtained lithium titanium oxide particles can be adjusted to the above-mentioned value by pulverizing the secondary particles of the lithium titanium oxide having a particle diameter $D_{50}$ of about 30 to 35 μm using the above-mentioned method under the above-mentioned conditions until $D_p/D_{50}$ is the above-mentioned value. In general, the particle diameters of the primary particles of the lithium titanium oxide included in the secondary particles do not significantly change even after the pulverizing process, and therefore, it is sufficient that $D_{50}$ of the lithium titanium oxide particles is mainly adjusted through the pulverizing process in order to adjust $D_p/D_{50}$ to the above-mentioned value.

A negative-electrode active material used in lithium-ion secondary batteries other than the lithium titanium oxide can also be used together with the lithium titanium oxide for the negative-electrode active material. However, the ratio of the negative-electrode active material other than the lithium titanium oxide to the total amount of the negative-electrode active material is preferably 30 mass % or less.

There is no particular limitation on the solid electrolyte for the negative electrode as long as it has lithium-ion conductivity, and examples thereof include sulfide-based solid electrolytes, hydride-based solid electrolytes, and oxide-based solid electrolytes.

Examples of the sulfide-based solid electrolytes include $Li_2S$—$P_2S_5$-based glass, $Li_2S$—$SiS_2$-based glass, $Li_2S$—$P_2S_5$—$GeS_2$-based glass, and $Li_2S$—$B_2S_3$-based glass. In addition, $Li_{10}GeP_2S_{12}$ (LGPS-based) and $Li_6PS_5Cl$ (argyrodite-based), which attract attention in recent years due to their high lithium-ion conductivity, can also be used. Out of these materials, the argyrodite-based material, which has a particularly high lithium-ion conductivity and has high chemical stability, is preferably used.

Examples of the hydride-based solid electrolytes include $LiBH_4$, and solid solutions of $LiBH_4$ and the following alkali metal compound (e.g., solid solutions in which the molar ratio between $LiBH_4$ and the alkali metal compound is 1:1 to 20:1). At least one selected from the group consisting of lithium halides (e.g., LiI, LiBr, LiF, and LiCl), rubidium halides (e.g., RbI, RbBr, RbF, and RbCl), cesium halides (e.g., CsI, CsBr, CsF, and CsCl), lithium amides, rubidium amides, and cesium amides can be used as the alkali metal compound in the above-mentioned solid solution.

Examples of the oxide-based solid electrolytes include $Li_7La_3Zr_2O_{12}$, $LiTi(PO_4)_3$, $LiGe(PO_4)_3$, and $LiLaTiO_3$.

One or two or more of the above-listed examples can be used as the solid electrolyte. Out of the above-listed solid electrolytes, the sulfide-based solid electrolytes are more preferably used because they have high lithium-ion conductivity and have a function of enhancing the moldability of the negative-electrode mixture.

Note that, although the $D_p$ value is substantially the same as that prior to pressing of the lithium titanium oxide even after the negative-electrode mixture is molded through compression molding such as press molding, the sulfide-based solid electrolytes out of the above-listed solid electrolytes are preferable because they are particularly soft, and thus using them in the negative electrode makes it possible to favorably suppress breakage of the primary particles of the lithium titanium oxide and thereby suppress a change in $D_p$ during pressing for forming the molded body made of the negative-electrode mixture.

Examples of the conductive assistant for the negative electrode include carbon materials such as graphite and carbon black.

The negative-electrode mixture may contain a binder or no binder. When the negative-electrode mixture contains a binder, a fluororesin such as polyvinylidene fluoride (PVDF) can be used as the binder.

When a current collector is used in the negative electrode, examples of the current collector include foils, punched metals, nets, expanded metals, and foamed metals that are made of copper, nickel, stainless steel, and aluminum; and carbon sheets.

The negative electrode can be manufactured by mixing the lithium titanium oxide particles serving as the active material, the solid electrolyte, the conductive assistant, and the like, for example, without using a solvent to prepare the negative-electrode mixture, and molding the negative-electrode mixture into pellets or the like. Also, the negative electrode may be formed by attaching the thus-obtained molded body made of the negative-electrode mixture and the current collector to each other.

Also, the molded body made of the negative-electrode mixture may be formed by mixing the above-mentioned negative-electrode mixture and a solvent to prepare a negative-electrode mixture-containing composition, applying this composition onto a substrate such as the current collector or the solid electrolyte layer to be opposed to the negative electrode, and performing pressing processing after drying the composition.

It is preferable to select a solvent that is less likely to deteriorate the solid electrolyte as the solvent used in the negative-electrode mixture-containing composition. In particular, the sulfide-based solid electrolytes and the hydride-based solid electrolytes cause chemical reactions with a minute amount of water, and therefore, it is preferable to use non-polar aprotic solvents such as hydrocarbon solvents including hexane, heptane, octane, nonane, decane, decaline, toluene, and xylene. In particular, it is more preferable to use a super dehydrated solvent in which the water content is reduced to 0.001 mass % (10 ppm) or less. Also, fluorine-based solvents such as "VERTREL (registered trademark)" manufactured by Du Pont-Mitsui Fluorochemicals Co., Ltd., "ZEORORA (registered trademark)" manufactured by Zeon Corporation, and "NOVEC (registered trademark)" manufactured by Sumitomo 3M Limited, and nonaqueous organic solvents such as dichloromethane and dimethyl ether can be used.

In the composition of the negative-electrode mixture, for example, the content of the negative-electrode active material is preferably 50 to 80 mass %, the content of the solid electrolyte is preferably 20 to 50 mass %, and the content of the conductive assistant is preferably 0.1 to 10 mass %. When the negative-electrode mixture contains a binder, the content thereof is preferably 0.1 to 10 mass %. Furthermore, the thickness of the molded article made of the negative-electrode mixture (in both the case where the negative electrode does not contain the current collector and the case where the negative electrode contains the current collector) is preferably 50 to 1000 µm.

The density of the molded body made of the negative-electrode mixture (calculated from the mass and thickness per unit area of the molded body made of the negative-electrode mixture) can be increased to 2.0 g/cm$^3$ or more by using lithium titanium oxide particles in which $D_p/D_{50}$ and the specific surface area satisfy the above-mentioned values, thus making it possible to increase the capacity and the energy density of an all-solid-state battery. Note that the molded body made of the negative-electrode mixture does not have to be porous unlike a negative electrode for a battery containing an organic electrolyte solution, and therefore, the upper limit of the density thereof is a value calculated from the densities of the materials that constitute the negative-electrode mixture (i.e., theoretical density).

All-Solid-State Battery

An all-solid-state battery according to the present invention includes a positive electrode, a negative electrode, and a solid electrolyte layer located between the positive electrode and the negative electrode, and the negative electrode for an all-solid-state battery according to the present invention is used as the negative electrode.

FIG. 1 is a schematic cross-sectional view showing an example of an all-solid-state battery according to the present invention. An all-solid-state battery 1 shown in FIG. 1 has a configuration in which a positive electrode 10, a negative electrode 20, and a solid electrolyte layer 30 located between the positive electrode 10 and the negative electrode 20 are sealed in an outer casing constituted by an outer can 40, a sealing can 50, and a resin gasket 60 located therebetween.

The sealing can 50 is fitted into the opening portion of the outer can 40 via the gasket 60, and the opening portion of the outer can 40 is sealed by fastening the end portion of the opening of the outer can 40 inward and thereby bringing the gasket 60 into contact with the sealing can 50. Thus, a structure in which the inside of an element is hermetically sealed is formed.

An outer can and a sealing can made of stainless steel or the like can be used. Moreover, polypropylene, nylon, or the like can be used as the material of the gasket. In addition, when heat resistance is required due to the application of a battery, fluororesins such as tetrafluoroethylene-perfluoroalkoxyethylene copolymers (PFA), and heat-resistant resins whose melting point is higher than 240° C., such as polyphenylene ether (PPE), polysulfone (PSF), polyarylate (PAR), polyethersulfone (PES), polyphenylene sulfide (PPS), and polyether ether ketone (PEEK), can also be used as the material of the gasket. When a battery is used for the application in which heat resistance is required, a glass hermetic seal can also be used to seal the battery.

Figure 2:
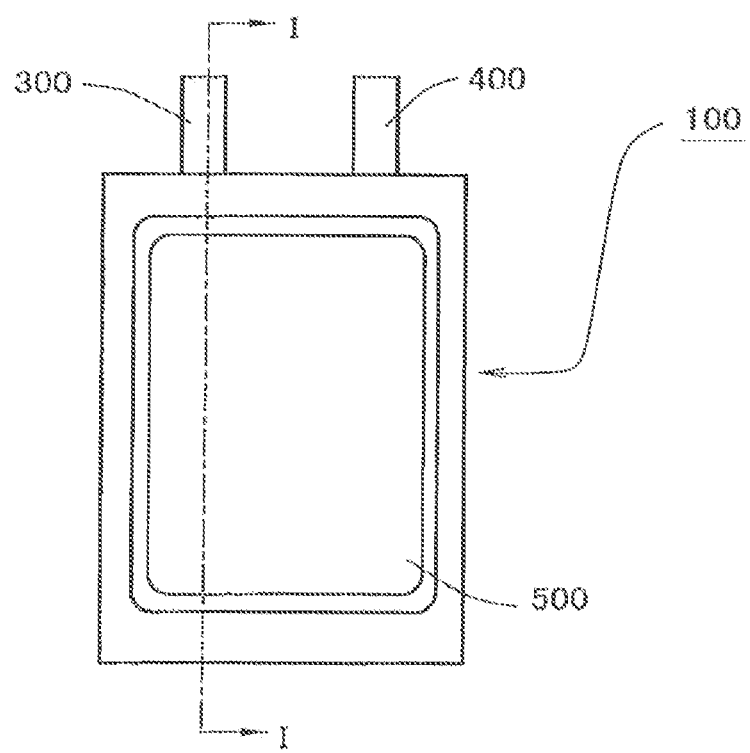
FIG. 2 is a schematic plan view showing an example of the all-solid-state battery according to the present invention.
Figure 3:
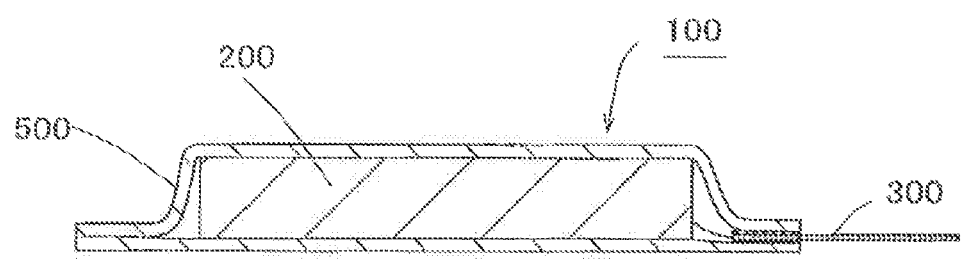
FIG. 3 is a cross-sectional view taken along line I-I in FIG. 2.

FIGS. 2 and 3 are schematic diagrams showing another example of the all-solid-state battery according to the present invention. FIG. 2 is a plan view of the all-solid-state battery, and FIG. 3 is a cross-sectional view taken along line I-I in FIG. 2.

An all-solid-state battery 100 shown in FIGS. 2 and 3 has a configuration in which an electrode body 200 that includes a positive electrode, a solid electrolyte layer, and the negative electrode according to the present invention is housed in a laminate-film outer casing 500 formed using two metal laminate films, and the laminate-film outer casing 500 is sealed by thermally welding the outer peripheral regions of the upper and lower laminate films. Note that the layers included in the laminate-film outer casing 500, and the positive electrode, the negative electrode, and separators included in the electrode body are not distinctively shown in FIG. 3 in order to avoid complication in the figure.

The positive electrode included in the electrode body 200 is connected to a positive electrode external terminal 300 in the battery 100, and the negative electrode included in the electrode body 200 is also connected to a negative electrode external terminal 400 in the battery 100, which is not shown in the drawings. One end of the positive electrode external terminal 300 and one end of the negative electrode external terminal 400 are drawn out of the laminate-film outer casing 500 so as to be capable of being connected to external devices and the like.

Positive Electrode

A positive electrode of an all-solid-state battery contains a positive-electrode active material, and generally contains a solid electrolyte.

There is no particular limitation on the positive-electrode active material as long as a positive-electrode active material used in a conventionally known lithium-ion secondary battery, namely an active material capable of occluding and releasing Li ions, is employed. Specific examples of the positive-electrode active material include spinel-type lithium manganese composite oxides represented by $LiM_xMn_{2-x}O_4$ (where M is at least one element selected from the group consisting of Li, B, Mg, Ca, Sr, Ba, Ti, V, Cr, Fe, Co, Ni, Cu, Al, Sn, Sb, In, Nb, Mo, W, Y, Ru, and Rh, and x satisfies $0.01 \leq x \leq 0.5$), layered compounds represented by $Li_xMn_{(1-y-x)}Ni_yM_zO_{(2-k)}F_l$ (where M is at least one element selected from the group consisting of Co, Mg, Al, B, Ti, V, Cr, Fe, Cu, Zn, Zr, Mo, Sn, Ca, Sr, and W, and x y z, k, and/satisfy $0.8 \leq x \leq 1.2$, $0 < y < 0.5$, $0 \leq z \leq 0.5$, $k+1<1$, $-0.1 \leq k \leq 0.2$, and $0 \leq l \leq 0.1$), lithium cobalt composite oxides represented by $LiCo_{1-x}M_xO_2$ (where M is at least one element selected from the group consisting of Al, Mg, Ti, Zr, Fe, Ni, Cu, Zn, Ga, Ge, Nb, Mo, Sn, Sb, and Ba, and x satisfies $0 \leq x \leq 0.5$), lithium nickel composite oxides represented by $LiNi_{1-x}M_xO_2$ (where M is at least one element selected from the group consisting of Al, Mg, Ti, Zr, Fe, Co, Cu, Zn, Ga, Ge, Nb, Mo, Sn, Sb, and Ba, and x satisfies $0 \leq x \leq 0.5$), olivine-type composite oxides represented by $LiM_{1-x}N_xPO_4$ (where M is at least one element selected from the group consisting of Fe, Mn, and Co, N is at least one element selected from the group consisting of Al, Mg, Ti, Zr, Ni, Cu, Zn, Ga, Ge, Nb, Mo, Sn, Sb, and Ba, and x satisfies $0 \leq x \leq 0.5$), and a lithium titanium composite oxide represented by $Li_4Ti_5O_{12}$. These compounds may be used alone or in combination of two or more.

One or two or more of the same solid electrolytes as those listed above as the examples of solid electrolytes that may be used in the negative electrode can be used as the solid electrolyte for the positive electrode. It is desirable that a sulfide-based solid electrolyte should be contained in order to further improve the battery characteristics.

For example, a positive electrode having a structure in which a layer made of a positive-electrode mixture containing a positive-electrode active material and a solid electrolyte and optionally a conductive assistant and a binder (positive-electrode mixture layer) is formed on one or both of the surfaces of a current collector, or a molded body obtained by molding the above-mentioned positive-electrode mixture into pellets or the like through compression molding can be used as the positive electrode.

For example, a fluororesin such as polyvinylidene fluoride (PVDF) can be used as the binder for the positive electrode. Also, a carbon material such as carbon black can be used as the conductive assistant for the positive electrode.

When a current collector is used in the positive electrode, examples of the current collector include foils, punched metals, nets, expanded metals, and foamed metals that are made of a metal such as aluminum or stainless steel; and carbon sheets.

For example, when a positive electrode containing a current collector is manufactured, a method performed as follows can be employed as the positive electrode manufacturing method: a positive-electrode mixture-containing composition (e.g., paste or slurry) obtained by dispersing a positive-electrode active material and a solid electrolyte and optionally a conductive assistant, a binder, and the like in a solvent such as xylene is applied to a current collector and dried, and then a layer of the positive-electrode mixture (positive-electrode mixture layer) is formed optionally by performing a compression molding process such as calendering processing.

As in the case of the solvent used in the negative-electrode mixture-containing composition, it is desirable that a solvent that is less likely to deteriorate the solid electrolyte should be selected as the solvent used in the positive-electrode mixture-containing composition. It is preferable to use the various solvents listed above as the solvents for the negative-electrode mixture-containing composition. It is particularly preferable to use a super dehydrated solvent in which the water content is reduced to 0.001 mass % (10 ppm) or less.

A positive electrode constituted by a molded body made of a positive-electrode mixture can be formed by compressing, through compression molding or the like, a positive-electrode mixture prepared by mixing a positive-electrode active material and a solid electrolyte and optionally a conductive assistant, a binder, and the like.

In the composition of the positive-electrode mixture in the positive electrode, for example, the content of the positive-electrode active material is preferably 50 to 90 mass %, the content of the solid electrolyte is preferably 10 to 50 mass %, and the content of the binder is preferably 0.1 to 10 mass %. When the positive-electrode mixture contains a conductive assistant, the content thereof is preferably 0.1 to 10 mass %. Furthermore, the thickness of the positive-electrode mixture layer in the positive electrode containing a current collector, and the thickness of the molded body made of the positive-electrode mixture are preferably 50 to 1000 μm.

Solid Electrolyte Layer

One or two or more of the same solid electrolytes as those listed above as the examples of solid electrolytes for the negative electrode can be used as the solid electrolyte in the solid electrolyte layer of the all-solid-state battery. However, it is desirable that a sulfide-based solid electrolyte should be contained in order to further improve the battery characteristics. It is more desirable that all of the positive electrode, the negative electrode, and the solid electrolyte layer contain a sulfide-based solid electrolyte.

The solid electrolyte layer may include, as a support, a porous material such as nonwoven fabric made of a resin.

The solid electrolyte layer can be formed using a method in which a solid electrolyte is compressed through compression molding or the like; a method in which a composition for forming a solid electrolyte layer that is prepared by dispersing a solid electrolyte in a solvent is applied to a substrate, the positive electrode, or the negative electrode and is then dried, and a compression molding process is optionally performed; and the like.

As in the case of the solvent used in the negative-electrode mixture-containing composition, it is desirable that a solvent that is less likely to deteriorate the solid electrolyte should be selected as the solvent used in the composition for forming a solid electrolyte layer. It is preferable to use the various solvents listed above as the solvents for the negative-electrode mixture-containing composition. It is particularly preferable to use a super dehydrated solvent in which the water content is reduced to 0.001 mass % (10 ppm) or less.

The thickness of the solid electrolyte layer is preferably 100 to 200 μm.

Electrode Body

The positive electrode and the negative electrode can be used for a battery in the form of a layered electrode body obtained by layering these electrodes with the solid electrolyte layer being located therebetween or in the form of a wound electrode body obtained by winding the above-mentioned layered electrode body.

Note that it is preferable to form the electrode body by performing compression molding in the state in which the positive electrode, the negative electrode, and the solid electrolyte layer are layered from the viewpoint of enhancing the mechanical strength of the electrode body.

Form of Battery

The all-solid-state battery may be in the form that includes an outer casing having a metal outer can with a closed-ended tubular shape (e.g., cylindrical shape or polygonal tubular shape) and a sealing structure for sealing the opening thereof instead of the form as shown in FIG. 1 that includes an outer casing constituted by an outer can, a sealing can, and a gasket, namely the form that is generally called a coin-shaped battery or button-shaped battery, and the form as shown in FIGS. 2 and 3 that includes an outer casing constituted by resin films or metal-resin laminate films.

EXAMPLES

Hereinafter, the present invention will be described in detail based on examples. However, the present invention is not limited to the following examples.

Example 1

Formation of Solid Electrolyte Layer 80 g of a sulfide-based solid electrolyte ($Li_6PS_5Cl$) was placed in a powder molding mold having a diameter of 10 mm, and a solid electrolyte layer was formed through compression molding using a pressing machine.

Production of Negative Electrode

Secondary particles of lithium titanate ($Li_4Ti_5O_{12}$) having $D_{50}$ of 33.6 μm were pulverized using a planetary ball mill, and thus lithium titanate particles to be used as a negative-electrode active material were obtained. The obtained lithium titanate particles had $D_p$ of 1.3 μm, $D_{50}$ of 2.14 μm, $D_p/D_{50}$ of 0.61, and a specific surface area of 2.70 m²/g.

The lithium titanate particles, the sulfide-based solid electrolyte, and graphite powder serving as a conductive assistant were mixed at a mass ratio of 60:8.5:31.5, and were kneaded well to prepare a negative-electrode mixture. Next, 15 mg of the negative-electrode mixture was placed on the solid electrolyte layer in the powder molding mold, and compression molding was performed using a pressing machine to form a negative electrode constituted by a molded body made of the negative-electrode mixture on the solid electrolyte layer. Note that $D_p$ of the lithium titanate in the molded body made of the negative-electrode mixture after compression molding was 1.3 μm, which was the same as that prior to compression molding.

Formation of Layered Electrode Body

An electrode formed by attaching a cylindrical molded body made of Li metal and a cylindrical molded body made of In metal to each other was used as a counter electrode. This counter electrode was placed on a surface of the solid electrolyte layer in the powder molding mold on a side opposite to the negative electrode, and compression molding was performed using a pressing machine to form a layered electrode body.

Assembly of Model Cell

The above-mentioned layered electrode body was used to produce an all-solid-state battery (model cell) having the same planar structure as that shown in FIG. 2. A negative-electrode current collecting foil (SUS foil) and a counter-electrode current collecting foil (SUS foil) were attached to a surface of an aluminum laminate film included in a laminate-film outer casing on the interior side of the outer casing so as to be adjacent to each other with a certain interval being provided therebetween. The current collecting foils cut out into a shape provided with a main body portion to be opposed to a surface on the negative electrode side or the counter electrode side of the layered electrode body, and a negative electrode external terminal and a counter electrode external terminal that protrude from the main body portion toward the outside of the battery were used.

A model cell was obtained by placing the layered electrode body on the negative-electrode current collecting foil of the laminate-film outer casing, covering the layered electrode body by the laminate-film outer casing such that the counter-electrode current collecting foil was disposed on the counter electrode of the layered electrode body, and thermally welding the remaining three sides of the laminate-film outer casing under vacuum to seal the laminate-film outer casing.

Example 2

Secondary particles of lithium titanate were pulverized in the same manner as in Example 1, except that the number of revolutions of the planetary ball mill was changed. Thus, lithium titanate for a negative-electrode active material having $D_p$ of 1.3 μm, $D_{50}$ of 1.86 μm, $D_p/D_{50}$ of 0.70, and a specific surface area of 4.19 m²/g was obtained A model cell was produced in the same manner as in Example 1, except that particles of this lithium titanate were used. Note that $D_p$ of the lithium titanate in the molded body made of the negative-electrode mixture after compression molding was 1.3 μm, which was the same as that prior to compression molding.

Example 3

Secondary particles of lithium titanate were pulverized in the same manner as in Example 1, except that the number of revolutions of the planetary ball mill was changed. Thus, lithium titanate for a negative-electrode active material having $D_p$ of 1.3 μm, $D_{50}$ of 2.02 μm, $D_p/D_{50}$ of 0.64, and a specific surface area of 4.00 m²/g was obtained A model cell was produced in the same manner as in Example 1, except that particles of this lithium titanate were used. Note that $D_p$ of the lithium titanate in the molded body made of the negative-electrode mixture after compression molding was 1.3 μm, which was the same as that prior to compression molding.

Comparative Example 1

A model cell was produced in the same manner as in Example 1, except that secondary particles of lithium titanate having $D_{50}$ of 7.3 μm were used as the negative-electrode active material without being pulverized. Note that the secondary particles of lithium titanate used as the negative-electrode active material had $D_p$ of 0.5 μm, $D_p/D_{50}$ of 0.07, and a specific surface area of 10.90 m²/g. Also, $D_p$ of the lithium titanate in the molded body made of the negative-electrode mixture after compression molding was 0.5 µm, which was the same as that prior to compression molding.

Comparative Example 2

A model cell was produced in the same manner as in Example 1, except that secondary particles of lithium titanate having $D_{50}$ of 4.53 µm were used as the negative-electrode active material without being pulverized. Note that the secondary particles of lithium titanate used as the negative-electrode active material had $D_p$ of 0.8 µm, $D_p/D_{50}$ of 0.18, and a specific surface area of 2.50 m$^2$/g. Also, $D_p$ of the lithium titanate in the molded body made of the negative-electrode mixture after compression molding was 0.8 µm, which was the same as that prior to compression molding.

Comparative Example 3

A model cell was produced in the same manner as in Example 1, except that secondary particles of lithium titanate having $D_{50}$ of 5.53 µm were used as the negative-electrode active material without being pulverized. Note that the secondary particles of lithium titanate used as the negative-electrode active material had $D_p$ of 2.5 µm, $D_p/D_{50}$ of 0.45, and a specific surface area of 2.20 m$^2$/g. Also, $D_p$ of the lithium titanate in the molded body made of the negative-electrode mixture after compression molding was 2.5 µm, which was the same as that prior to compression molding.

The output characteristics of the model cells provided with the negative electrodes of the examples and the comparative examples were evaluated under the following conditions. First, in the pressurized state (1 t/cm$^2$), each model cell was charged to a voltage of 0.38 V with a constant current at a current value of 0.05 C, was subsequently charged with a constant voltage of 0.38 V until the current value reached 0.01 C, and was then discharged to 1.88 V at a current value of 0.05 C. Next, each model cell was charged to a voltage of 0.38 V with a constant current at a current value of 0.05 C, was subsequently charged with a constant voltage of 0.38 V until the current value reached 0.01 C, was then discharged at a current value of 0.05 C until the depth of charge (SOC) reached 50%, and was left to stand for 1 hour. Thereafter, the voltage of each model cell was determined after 10-sec pulse discharge was performed at a current value of 0.05 C, and DCR was calculated from this value. The smaller DCR determined using this method is, the better the output characteristics of the model cell is (i.e., the capacity during high-current discharge is large). Therefore, it can be said that the negative electrode included in such a model cell can be used to form an all-solid-state battery having excellent output characteristics.

Table 1 shows the values of $D_p/D_{50}$ and the specific surface areas of the lithium titanate particles used in the negative electrodes of the examples and the comparative examples, and the results of the above-mentioned evaluation. Note that "DCR" of each model cell in Table 1 is represented as a relative value when the value obtained in Example 2 is taken as 100.

TABLE 1

| | Lithium titanate particles | | Model cell |
|---|---|---|---|
| | $D_p/D_{50}$ | Specific surface area (m$^2$/g) | DCR |
| Ex. 1 | 0.61 | 2.70 | 136 |
| Ex. 2 | 0.70 | 4.19 | 100 |

TABLE 1-continued

| | Lithium titanate particles | | Model cell |
|---|---|---|---|
| | $D_p/D_{50}$ | Specific surface area (m$^2$/g) | DCR |
| Ex. 3 | 0.64 | 4.00 | 121 |
| Comp. Ex. 1 | 0.07 | 10.90 | 180 |
| Comp. Ex. 2 | 0.18 | 2.50 | 220 |
| Comp. Ex. 3 | 0.45 | 2.20 | 171 |

As shown in Table 1, the model cells provided with the negative electrodes of Examples 1 to 3 in which lithium titanium oxide (lithium titanate) particles with appropriate values of $D_p/D_{50}$ and the specific surface area were used as the negative-electrode active material had small DCR values and excellent output characteristics.

In contrast, the model cells provided with the negative electrodes of Comparative Examples 1 to 3 in which lithium titanium oxide particles (secondary particles) with an inappropriate value of $D_p/D_{50}$ were used as the negative-electrode active material had large DCR values and inferior output characteristics. Note that the lithium titanium oxide particles used in Comparative Examples 1 to 3 had a relatively large specific surface area due to not primary particles having a rough surface state but primary particles aggregating into secondary particles. It is considered that the large specific surface areas thereof did not contribute to facilitating the contact of the lithium titanium oxide particles (primary particles contained in secondary particles or primary particles that have separated from secondary particles) with the solid electrolyte and the conductive assistant.

The present invention may be embodied in other forms without departing from the spirit or essential characteristics thereof. The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The all-solid-state battery according to the present invention may be applied to the same applications as those of conventionally known secondary batteries. However, since the all-solid-state battery according to the present invention includes a solid electrolyte instead of an organic electrolyte solution, it has excellent heat resistance and can thus be favorably used in applications that are exposed to high temperatures.

LIST OF REFERENCE NUMERALS 1, 100 All-solid-state battery
10 Positive electrode
20 Negative electrode
30 Solid electrolyte layer
40 Outer can
50 Sealing can
60 Gasket
200 Electrode body
300 Positive electrode external terminal
400 Negative electrode external terminal
500 Laminate-film outer casing

The invention claimed is:

1. A negative electrode for an all-solid-state battery to be used in an all-solid-state battery, the negative electrode comprising
a molded body made of a negative-electrode mixture that contains a negative-electrode active material, a solid electrolyte, and a conductive assistant,
wherein lithium titanium oxide particles in which a ratio $D_p/D_{50}$ of a primary particle diameter $D_p$ to a particle diameter $D_{50}$ is greater than 0.6 and a specific surface area is 2 m²/g or more are contained as the negative-electrode active material.

2. The negative electrode for an all-solid-state battery according to claim 1,
wherein the lithium titanium oxide particles have $D_p$ of 0.7 μm or more and 10 μm or less.

3. The negative electrode for an all-solid-state battery according to claim 1,
wherein the solid electrolyte is a sulfide-based solid electrolyte.

4. The negative electrode for an all-solid-state battery according to claim 3,
wherein the solid electrolyte is an argyrodite-based sulfide-based solid electrolyte.

5. The negative electrode for an all-solid-state battery according to claim 1,
wherein a lithium titanium oxide represented by General Composition Formula (1) below is contained as the lithium titanium oxide:

$$Li[Li_{1/3-a}M^1{}_aTi_{5/3-b}M^2{}_b]O_4 \qquad (1)$$

where $M^1$ is at least one element selected from the group consisting of Na, Mg, K, Ca, Sr, and Ba, $M^2$ is at least one element selected from the group consisting of Al, V, Cr, Fe, Co, Ni, Zn, Ym, Zr, Nb, Mo, Ta, and W, and a and b respectively satisfy $0 \le a < 1/3$ and $0 \le b \le 2/3$.

6. An all-solid-state battery comprising:
a positive electrode;
a negative electrode; and
a solid electrolyte layer located between the positive electrode and the negative electrode,
wherein the negative electrode for an all-solid-state battery according to claim 1 is used as the negative electrode.

* * * * *